(12) United States Patent
Nishita

(10) Patent No.: US 10,809,379 B2
(45) Date of Patent: Oct. 20, 2020

(54) THREE-DIMENSIONAL POSITION MEASURING SYSTEM, THREE-DIMENSIONAL POSITION MEASURING METHOD, AND MEASURING MODULE

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 757 days.

(21) Appl. No.: 15/630,609

(22) Filed: Jun. 22, 2017

(65) Prior Publication Data

US 2018/0003820 A1    Jan. 4, 2018

(30) Foreign Application Priority Data

Jul. 4, 2016  (JP) .................................. 2016-132471
Feb. 2, 2017  (JP) .................................. 2017-017273

(51) Int. Cl.
*G01C 3/08* (2006.01)
*G01S 17/86* (2020.01)
(Continued)

(52) U.S. Cl.
CPC .............. *G01S 17/86* (2020.01); *G01C 11/02* (2013.01); *G01C 15/002* (2013.01); *G01P 15/18* (2013.01);
(Continued)

(58) Field of Classification Search
CPC ........ G01S 17/86; G01S 17/89; G01S 7/4808; G01S 17/87; G01S 17/66; G01S 17/42;
(Continued)

(56) References Cited

U.S. PATENT DOCUMENTS 9,513,107 B2* 12/2016 Zweigle ................ G05D 1/024
2009/0323121 A1* 12/2009 Valkenburg .......... G01C 15/002
358/1.18

(Continued)

FOREIGN PATENT DOCUMENTS

JP        3735422 B2    10/2005

*Primary Examiner* — Samantha K Abraham
(74) *Attorney, Agent, or Firm* — Roberts Calderon Safran & Cole P.C.

(57) ABSTRACT

Provided is a three-dimensional position measuring system, a three-dimensional position measuring method, and a measuring module with which measurement can be performed without a special operation constraint even in state where a measuring module is inclined. The three-dimensional position measuring system includes a measuring module that includes a target, an omnidirectional camera, and a triaxial accelerometer, and is grasped a positional relationship among the target, the omnidirectional camera, and a measurement point, and a surveying instrument including a light output section that outputs light toward the target and a measurement section that performs distance measuring and angle measuring to the target. Since the measuring module including the target is equipped with the omnidirectional camera and the triaxial accelerometer, a posture direction of the measuring module can be identified.

6 Claims, 13 Drawing Sheets

(51) Int. Cl.
  *G01C 11/02* (2006.01)
  *G01S 17/42* (2006.01)
  *G01P 15/18* (2013.01)
  *G01S 17/89* (2020.01)
  *G01C 15/00* (2006.01)
  *G01S 7/48* (2006.01)
  *G01S 17/87* (2020.01)
  *G01S 17/66* (2006.01)
  *H04N 5/232* (2006.01)

(52) U.S. Cl.
  CPC ............ *G01S 7/4808* (2013.01); *G01S 17/42* (2013.01); *G01S 17/66* (2013.01); *G01S 17/87* (2013.01); *G01S 17/89* (2013.01); *H04N 5/23238* (2013.01)

(58) Field of Classification Search
  CPC ....... G01C 15/002; G01C 11/02; G01P 15/18; H04N 5/23238
  See application file for complete search history.

(56) References Cited

U.S. PATENT DOCUMENTS

2012/0007982 A1* 1/2012 Giuffrida .............. H04W 4/027
  348/144
2013/0096873 A1* 4/2013 Rosengaus ........... G01C 15/002
  702/151
2015/0098079 A1* 4/2015 Montgomery ........ G01S 17/875
  356/138
2016/0371544 A1* 12/2016 MacDonald ........... G01B 11/02

* cited by examiner

THREE-DIMENSIONAL POSITION MEASURING SYSTEM, THREE-DIMENSIONAL POSITION MEASURING METHOD, AND MEASURING MODULE

TECHNICAL FIELD

The present invention relates to a system of measuring a three-dimensional position of a measurement point, a three-dimensional position measuring method, and a measuring module.

BACKGROUND ART

In the fields of survey, measurement, or BIM (Building Information Modeling), a three-dimensional position of a measurement point is measured by using a surveying instrument that performs distance measuring and angle measuring and a retroreflective prism. However, due to a necessary size of the prism, an optical reflection point of the prism cannot be directly set at the measurement point. Therefore, generally, a method is adopted in which a prism is fixed to a pointing rod.

In detail, three-dimensional position measurement of a prism is performed in a state where a tip end of a pointing rod is installed at a measurement point, the prism is fixed to a position on the pointing rod deviated by a known fixed length from the measurement point, and a vertical state of the pointing rod is secured by using a bubble tube, etc., and a three-dimensional position of the measurement point is calculated by moving positional information vertically downward by the fixed length from this measured value. However, this method cannot be used in a case where the pointing rod must be inclined, such as at a corner of a room, etc.

On the other hand, there is a system that can perform measurement even in the state where the pointing rod is inclined from a measurement point. Patent Literature 1 discloses a system in which two prisms are fixed to two points separated by a known length and the prisms at the two points are measured, and a position of a measurement point can be calculated based on three-dimensional positions of the two points.

CITATION LIST

Patent Literature

Patent Literature 1: Japanese Patent No. 3735422

SUMMARY OF THE INVENTION

Technical Problem

However, in the configuration shown in Patent Literature 1, the prisms at two points cannot be simultaneously measured, so that there is an operation constraint that the pointing rod (prisms) is made to stand still during measurement of the two points.

In order to solve the above-described problem, an object of the present invention is to provide a three-dimensional position measuring system, a three-dimensional position measuring method, and a measuring module with which measurement can be performed without a special operation constraint even in a state where a measuring module is inclined.

Solution Means

In order to solve the above-described problem, a three-dimensional position measuring system according to an aspect of the present invention includes a measuring module that includes a target, an omnidirectional camera, and a triaxial accelerometer, and is grasped a positional relationship among the target, the omnidirectional camera, and a measurement point, and a surveying instrument including a light output section that outputs light toward the target direction and a measurement section that performs distance measuring and angle measuring to the target.

In the measuring system, in an embodiment, it is also preferable that the target and the omnidirectional camera are arranged on a straight line, and the measurement point is disposed in a known direction from the straight line by a distance meter or a pointing rod with a known length.

In the measuring system of the embodiment described above, it is also preferable that (a) a distance and an angle to the target are measured by the measurement section and a surveying instrument-target vector is calculated, (b) light is output to the target from the light output section, and based on a position of output light projected on an image imaged by the omnidirectional camera, a camera-surveying instrument directional vector is calculated, (c) based on the camera-surveying instrument directional vector obtained in (b) and a vertical downward directional vector obtained from the triaxial accelerometer, a target-measurement point directional vector is calculated, (d) based on the positional relationship among the target, the omnidirectional camera, and the measurement point, and the target-measurement point directional vector obtained in (c), a target-measurement point vector is calculated, and (e) by synthesizing the vectors obtained in (a) and (d), a three-dimensional position of the measurement point is measured.

In the above-described measuring system, according to another embodiment, it is also preferable that the target and the omnidirectional camera are arranged on a straight line, and the measuring system further includes a pointer which outputs light in a known direction with respect to the straight line and the positional relationship of which with the measuring module is grasped in advance.

In the measuring system according to the another embodiment described above, it is also preferable that (f) a distance and an angle to the target are measured by the measurement section, and a surveying instrument-target vector is calculated, (g) light is output to the target by the light output section, and based on a position of output light projected on an image imaged by the omnidirectional camera, a camera-surveying instrument directional vector is calculated, (h) based on the camera-surveying instrument directional vector obtained in (g) and a vertical downward directional vector obtained from the triaxial accelerometer, a target-pointer directional vector is calculated, (i) based on a positional relationship among the target-pointer directional vector obtained in (h) and a light emission directional vector of the pointer obtained from the known direction, a camera-measurement point directional vector obtained from a position of light of the pointer projected on the image imaged by the omnidirectional camera, and the pointer, a distance to the measurement point is calculated, (j) based on a positional relationship among the target, the omnidirectional camera, and the pointer and the target-pointer directional vector obtained in (h), a target-pointer vector is calculated, (k) based on the light emission directional vector obtained in (i) and the distance, a pointer-measurement point vector is calculated, and (l) by synthesizing the vectors obtained in (f), (j), and (k), a three-dimensional position of the measurement point is measured.

In the measuring system described above, according to still another embodiment, it is also preferable that the target and the omnidirectional camera are arranged on a straight line, and the measuring system further includes a scanner which has a scanner reference axis directed in a known direction with respect to the straight line, and a positional relationship of which with the measuring module is grasped in advance.

In the measuring system according to the still another embodiment described above, it is also preferable that (m) a distance and an angle to the target are measured by the measurement section, and a surveying instrument-target vector is calculated, (n) light is output toward the target from the light output section, and based on a position of output light projected on an image imaged by the omnidirectional camera, a camera-surveying instrument directional vector is calculated, (o) a vertical downward directional vector is acquired from the triaxial accelerometer, (p) based on the camera-surveying instrument directional vector obtained in (n) and the vertical downward directional vector obtained in (o), a positional relationship among the target, the omnidirectional camera, and a light output point of the scanner, and the fact that a direction of the scanner reference axis is relatively fixed on a coordinate system of the omnidirectional camera, a prism-output point vector is calculated, (q) based on the measured distance and a deflection direction of the scanner, an output point-scanning point vector is calculated for each scanning point, and (r) by synthesizing the vectors obtained in (m), (p), and (q), a three-dimensional position of each scanning point of the scanner is measured.

Effect of the Invention

According to the present invention, without paying attention to a posture of a measuring module, a three-dimensional position of a measurement point can be measured.

DETAILED DESCRIPTION OF EMBODIMENTS

Next, preferred embodiments of the present invention are described with reference to the drawings.

First Embodiment

Figure 1:
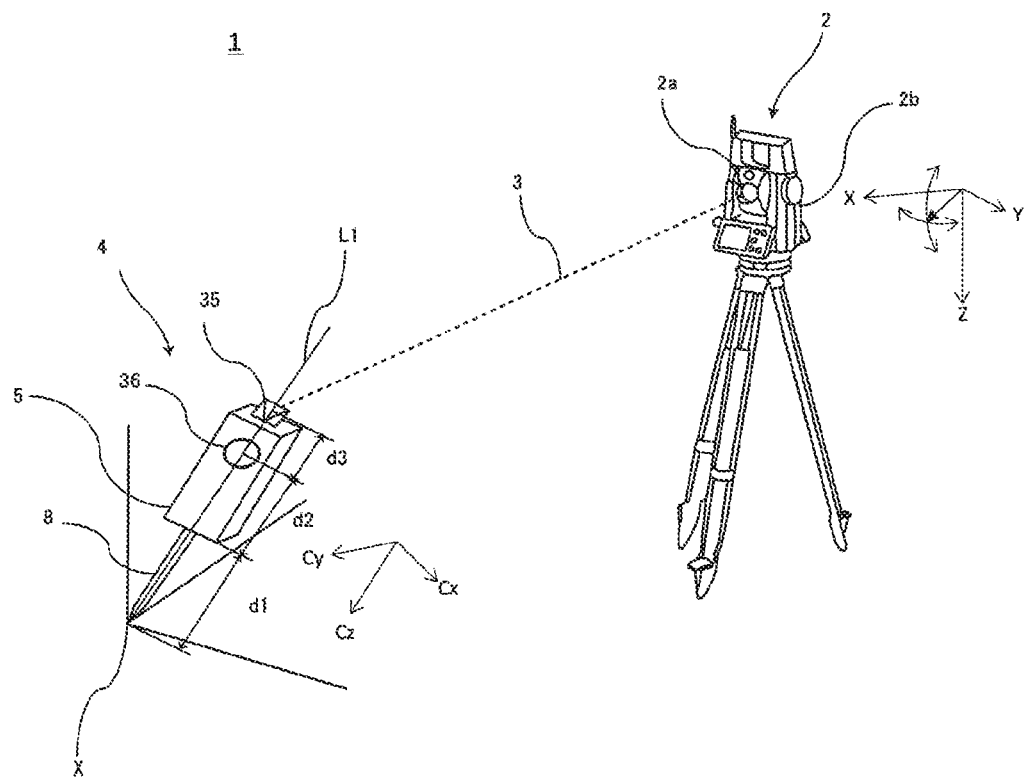
FIG. 1 is an external perspective view of a measuring system according to a first embodiment.

FIG. 1 is an external perspective view of a measuring system according to a first embodiment. The reference sign 1 in FIG. 1 denotes a three-dimensional position measuring system (hereinafter, simply referred to as measuring system) according to the present embodiment. A measuring system 1 includes a surveying instrument 2 and a measuring module 4 in appearance.

The surveying instrument 2 is installed at a known point by using a tripod, and includes, in order from the lower side, a leveling section, a base portion provided on the leveling section, a bracket portion 2b that rotates horizontally on the base portion, and a telescope 2a that rotates vertically at a center of the bracket portion 2b. The reference sign X denotes a measurement point. The measuring module 4 is carried by an operator, and used near the measurement point X. The measuring module 4 includes a housing 5, a prism 35 as a target, an omnidirectional camera 36, and a pointing rod 8 in appearance.

Figure 2:
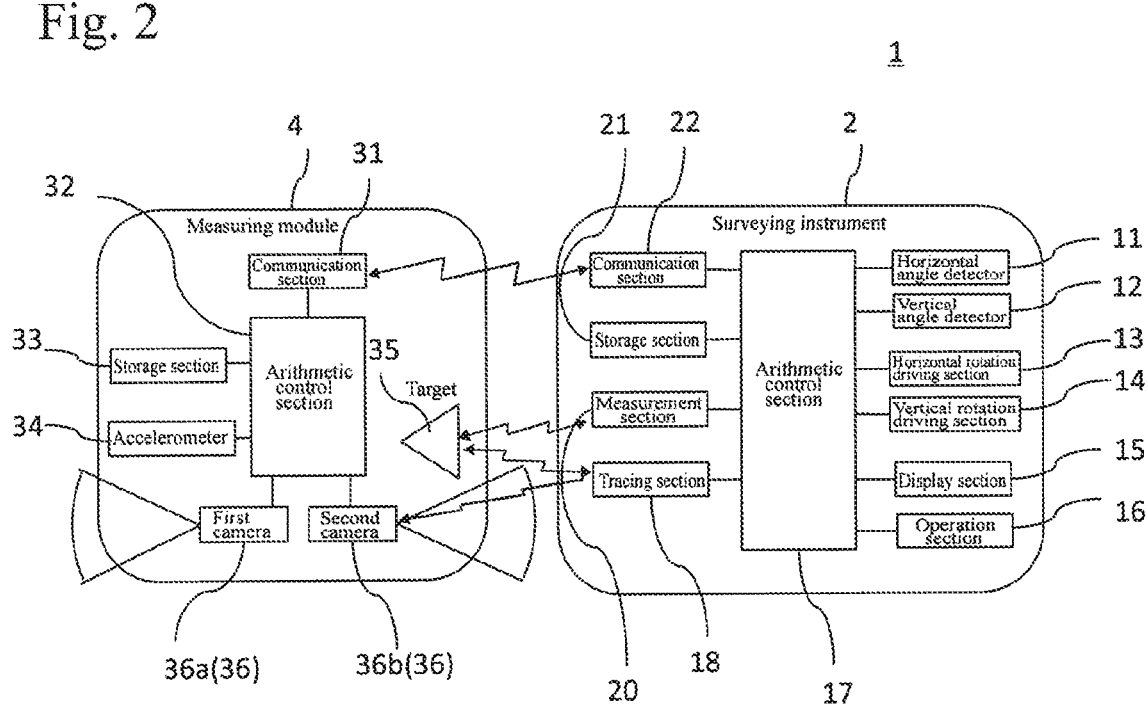
FIG. 2 is a control block diagram of the above-described measuring system.

FIG. 2 is a control bock diagram of the measuring system 1.

The surveying instrument 2 is a motor drive total station, and includes, as shown in FIG. 2, a horizontal angle detector 11, a vertical angle detector 12, a horizontal rotation driving section 13, a vertical rotation driving section 14, a display section 15, an operation section 16, an arithmetic control section 17, a tracking section 18, a measurement section 20, a storage section 21, and a communication section 22. The horizontal angle detector 11, the vertical angle detector 12, the horizontal rotation driving section 13, the vertical rotation driving section 14, the arithmetic control section 17, the storage section 21, and the communication section 22 are housed in the bracket portion 2b, and the display section 15 and the operation section 16 are provided outside the bracket portion 2b. The tracking section 18 and the measurement section 20 are housed in the telescope 2a.

The horizontal rotation driving section 13 and the vertical rotation driving section 14 are motors, and are controlled by the arithmetic control section 17 to drive a horizontal rotary shaft and a vertical rotary shaft, respectively. In the surveying instrument 2, by collaboration of horizontal rotation of the bracket portion 2b and vertical rotation of the telescope 2a, distance measuring light or tracking light is output from the telescope 2a.

The display section 15 and the operation section 16 are interfaces of the measuring system 1, and by these sections, commanding and setting of a measuring operation and confirmation of operation status and measurement results can be performed.

The horizontal angle detector 11 and the vertical angle detector 12 is an absolute encoder or an incremental encoder including a rotary disk, a slit, a light emitting diode, and an image sensor. The horizontal angle detector 11 is provided with respect to the horizontal rotary shaft and detects a rotation angle in the horizontal direction of the bracket portion 2b. The vertical angle detector 12 is provided with respect to the vertical rotary shaft and detects a rotation angle in the vertical direction of the telescope 2a.

The tracking section 18 includes a tracking light transmitting section that outputs, as tracking light, an infrared laser, etc., with a wavelength different from that of distance measuring light, and a tracking light receiving section including an image sensor (for example, a CCD sensor or a CMOS sensor). The tracking section 18 acquires, in the tracking light receiving section, a landscape image including tracking light reflected on the prism 35 and a landscape image excluding the tracking light. Both of these images are transmitted to the arithmetic control section 17. In the arithmetic control section 17, a center of an image of the prism 35 is obtained from a difference between the both images, a position at which a deviation of the center of the image from a center of a visual axis of the telescope 2a falls within a certain value is detected as a position of the prism 35, and automatic tracking is performed so that the telescope 2a always faces the prism 35. In the present embodiment, the tracking section 18 serves as a light output section.

The measurement section 20 includes a distance measuring light transmitting section and a distance measuring light receiving section, and outputs distance measuring light, for example, an infrared laser, etc., to the prism 35 and receives light reflected on the prism. Then, the measurement section 20 captures the prism 35, and when automatic leveling is completed, performs distance measuring and angle measuring to the prism 35. The reference sign 3 in FIG. 1 denotes an optical axis of distance measuring light or tracking light.

The arithmetic control section 17 is a microcontroller including, for example, a CPU, a ROM, and a RAM, etc., mounted on an integrated circuit, and performs drive control of the rotation driving sections 13 and 14, light emission control of the measurement section 20 and the tracking section 18, and automatic tracking, automatic leveling, distance measuring, and angle measuring of the target to obtain measurement data. The storage section 21 is, for example, a hard disk drive, and stores programs for the arithmetic processing described above. Acquired measurement data is stored in this storage section.

The communication section 22 can make radio communications with a communication section 31 (described below) of the measuring module 4 side, and transmits measurement data stored in the storage section 21 under control of the arithmetic control section 17 and receives measurement values from the communication section 31.

On the other hand, the measuring module 4 includes the communication section 31, an arithmetic control section 32, a storage section 33, an accelerometer 34, a prism 35, and an omnidirectional camera 36.

The prism 35 is a 360-degree prism formed by, for example, radially combining a plurality of triangular pyramid-shaped prisms, and retro-reflects light made incident in any direction (360-degree directions).

The omnidirectional camera 36 is a so-called 360-degree camera, includes a first camera 36a and a second camera 36b, and can image all directions at a time by synthesizing images imaged by the respective cameras 36a and 36b.

The accelerometer 34 is a triaxial accelerometer, and can detect a degree of deviation of a z-axis direction of the measuring module 4 from the vertical direction.

The communication section 31 receives measurement data from the communication section 22 of the surveying instrument 2 side, and transmits a three-dimensional position measured by the measuring module 4 to the communication section 22. The arithmetic control section 32 is a microcontroller, and measures a three-dimensional position of the measurement point X described below. The storage section 33 is, for example, a hard disk drive, and stores calculation programs for measurement of the above-described three-dimensional position. Also, imaged image data is stored in this storage section.

The measuring module 4 has the above-described elements and the following disposition. The accelerometer 34, the communication section 31, the arithmetic control section 32, and the storage section 33 are housed in the housing 5. As shown in FIG. 1, the prism 35 is fixed to an upper surface of the housing 5. The omnidirectional camera 36 is housed in the housing 5 so that the cameras 36a and 36b respectively appear on opposite side surfaces of the housing 5. The pointing rod 8 is fixed perpendicularly to the lower surface of the housing 5, and a tip end thereof is set at the measurement point X at the time of measurement.

Further, a center of the prism 35 and a center of the omnidirectional camera 36 (the center position between the cameras 36a and 36b) are arranged to dispose on the same straight line L1, and an axis of the pointing rod 8 is arranged to dispose and match the straight line L1. A length d1 of the pointing rod 8, a length d2 from a base end portion of the pointing rod 8 to the omnidirectional camera 36 (camera center), and a length d3 from the omnidirectional camera 36 (camera center) to the prism 35 (prism center) are known in advance.

Figure 3:
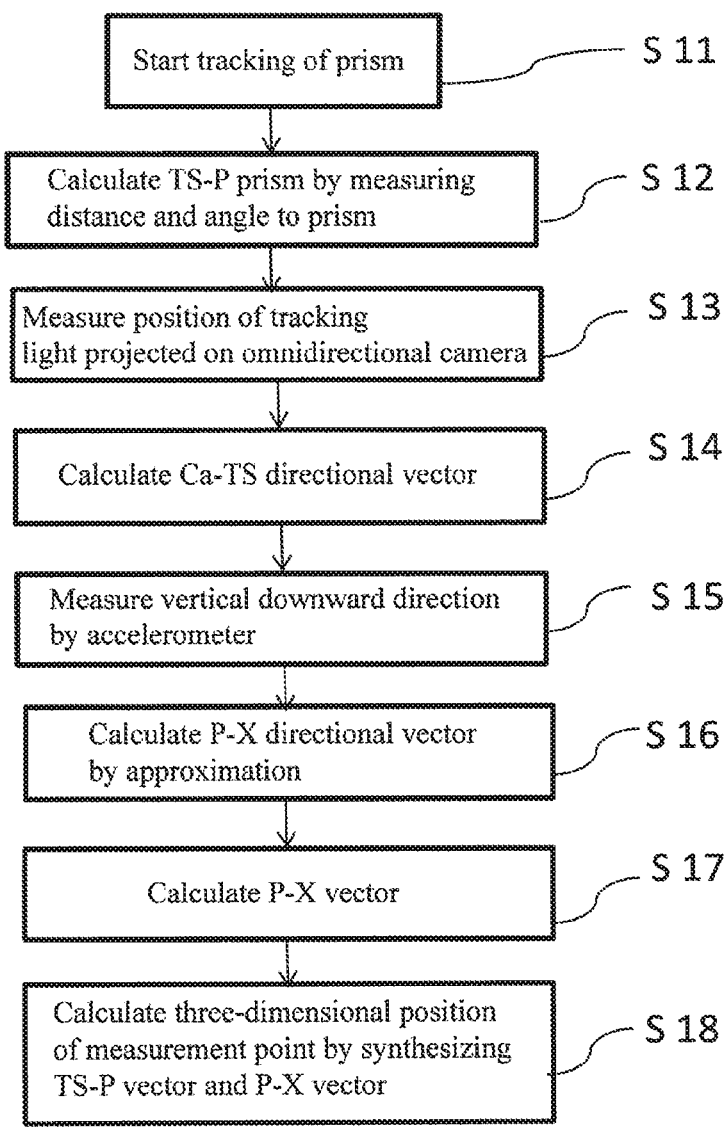
FIG. 3 is a three-dimensional position measurement flowchart according to the first embodiment.
Figure 4:
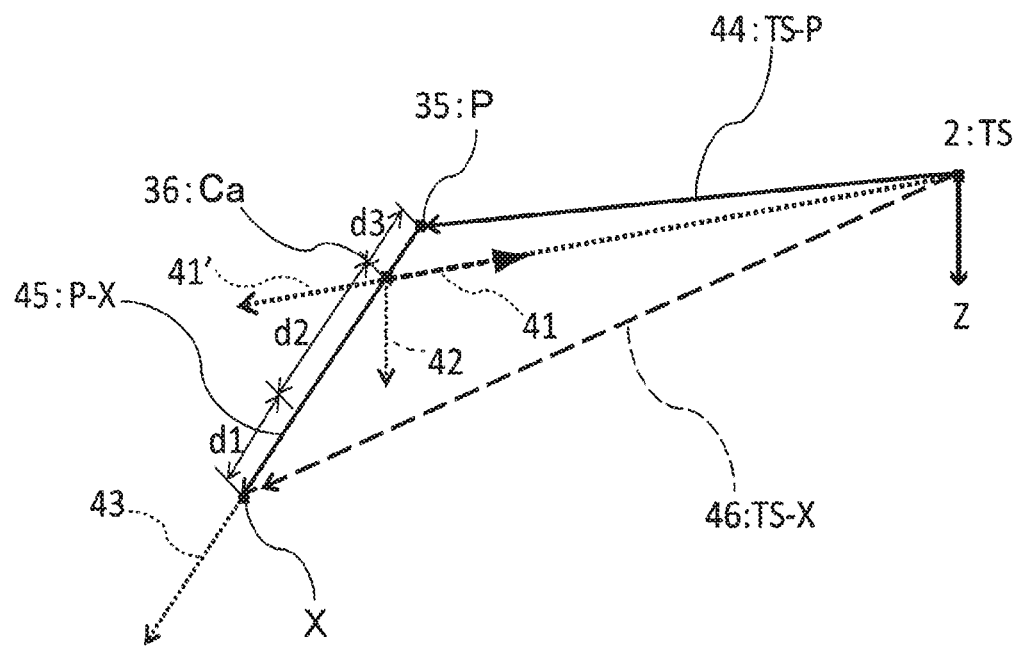
FIG. 4 is an image figure of the above-described flow.
Figure 5:
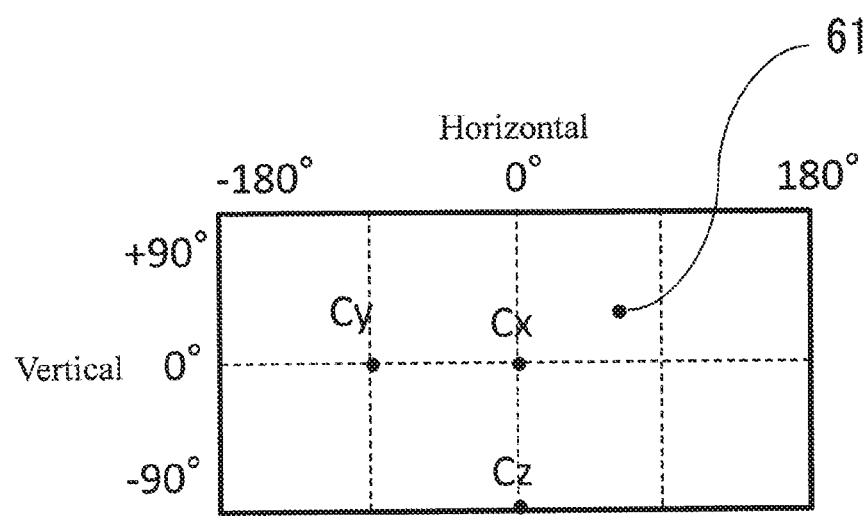
FIG. 5 is a diagram illustrating an image imaged by an omnidirectional camera.

By using the measuring system 1 described above, a three-dimensional position of a measurement point X can be measured according to the following method. FIG. 3 is a three-dimensional position measurement flowchart according to a first embodiment, FIG. 4 is an image figure of the flow, and FIG. 5 is a diagram illustrating an image imaged by the omnidirectional camera 36. As shown in FIG. 5, the omnidirectional camera 36 has a field of view of −180° to 180° in the horizontal direction and −90° to 90° in the vertical direction. A position of the image reflected herein is obtained in a local coordinate system (Cx, Cy, and Cz in FIG. 1) according to the field of view of the omnidirectional camera 36. This camera coordinate system (Cx, Cy, and Cz) is different from the TS coordinate system (X, Y, and Z in FIG. 1) of the surveying instrument 2 in which a vertical downward directional vector (Z direction) is set in the direction of gravitational force. In the following steps, description is given while it is clearly notified whether a camera coordinate system or a TS coordinate system is applied.

As shown in FIG. 3, first, in Step S11, the pointing rod 8 of the measuring module 4 is installed at the measurement point X, and automatic tracking of the prism 35 is started by the surveying instrument 2.

Next, in Step S12, the arithmetic control section 17 of the surveying instrument 2 measures a distance and an angle to the prism 35 by the measurement section 20 at the automatically tracked position to measure a three-dimensional position of the prism 35. Then, from the three-dimensional position of the prism 35, the arithmetic control section calculates a vector from the surveying instrument 2 to the prism 35, that is, a TS-P vector 44 (TS coordinate system) (refer to FIG. 4).

Next, in Step S13, the arithmetic control section 32 of the measuring module 4 measures a position of an image of tracking light projected on an image imaged by the omnidirectional camera 36. The image of the tracking light is projected, for example, as shown by the reference sign 61 in FIG. 5.

Next, in Step S14, the arithmetic control section 32 obtains a horizontal inclination angle and a vertical inclination angle of the omnidirectional camera 36 from the position of the image 61 of the tracking light obtained in Step S13, and from these two inclination angles, calculates a directional vector from the omnidirectional camera 36 to the surveying instrument 2, that is, a Ca-TS directional vector 41 (camera coordinate system) (refer to FIG. 4). A directional vector is a vector that does not have a magnitude but has only directional information.

Next, in Step S15, from triaxial values obtained by the accelerometer 34, a vertical downward directional vector 42 (camera coordinate system) is measured.

Next, in Step S16, the arithmetic control section 32 converts the Ca-TS directional vector 41 in Step S14 into an opposite vector, that is, a TS-Ca directional vector 41' (camera coordinate system), and since a distance between the measuring module 4 and the surveying instrument 2 is sufficiently longer than a distance d3 between the omnidirectional camera 36 and the prism 35, the arithmetic control section 32 applies the TS-Ca directional vector 41' (camera coordinate system) to the TS coordinate system on the assumption that the TS-Ca directional vector 41' matches the directional vector of the TS-P vector 44 (TS coordinate system) obtained in Step S12 (on the assumption that the position of the omnidirectional camera 36 is the same of the prism 35). Simultaneously, the arithmetic control section 32 applies the vertical downward directional vector 42 to the Z direction of the TS coordinate system, and since the direction of the pointing rod 8 in the camera coordinate system is relatively fixed, calculates a directional vector from the prism 35 to the measurement point X, that is, a P-X directional vector 43 (TS coordinate system).

Next, in Step S17, the arithmetic control section 32 calculates a vector from the prism 35 to the measurement point X, that is, a P-X vector 45 (TS coordinate system) based on the length d1 of the pointing rod 8, the length d2 from the base end portion of the pointing rod 8 to the omnidirectional camera 36, the length d3 from the omnidirectional camera 36 to the prism 35, and the P-X directional vector 43 obtained in Step S16.

Last, in Step S18, the arithmetic control section 32 measures a three-dimensional position of the measurement point X by obtaining a vector from the surveying instrument 2 to the measurement point X, that is, a TS-X vector 46 (TS coordinate system) by synthesizing the TS-P vector 44 (TS coordinate system) in Step S12 and the P-X vector 45 (TS coordinate system) in Step S17.

According to the first embodiment described above, since the measuring module 4 including the prism 35 is provided with the omnidirectional camera 36 and the accelerometer 34, a posture direction of the measuring module 4 (P-X directional vector 43) can be identified. Therefore, the measurement point X can be automatically measured by moving positional information by a fixed length (d1+d2+d3) only in the direction of the P-X directional vector 43 from the three-dimensional position of the prism 35.

Therefore, when an operator can point to the measurement point X with the pointing rod 8, measurement can be performed without a special operation constraint even in a state where the measuring module 4 is inclined.

In addition, since the omnidirectional camera 36 is disposed near the prism 35 and the surveying instrument 2 always tracks the prism 35, tracking light is always projected on the omnidirectional camera 36. Therefore, in the omnidirectional camera 36, a sufficient light amount to detect the tracking light is secured. The measuring system 1 does not need to output light in all directions from the surveying instrument 2.

In the description given above, by assuming that the distance between the measuring module 4 and the surveying instrument 2 is sufficiently longer than the distance d3 between the omnidirectional camera 36 and the prism 35, a three-dimensional position of the measurement point X is obtained by using approximation, however, it is also preferable to correct this point. An example of the correction is described. Since the distance d3 between the omnidirectional camera 36 and the prism 35 is known, a position of the omnidirectional camera 36 can be obtained as TS coordinates. In the step of correction, these calculations are regarded as provisional calculations, and based on coordinates (TS coordinates) of the omnidirectional camera 36 provisionally calculated, a vector from the surveying instrument 2 to the omnidirectional camera 36, that is, a TS-Ca vector (TS coordinate system) is calculated. Then, the TS-Ca directional vector 41' (camera coordinate system) in Step S16 described above is substituted by the TS-Ca vector (TS coordinate system), and simultaneously, the vertical downward directional vector 42 is applied to the TS coordinate system, and a directional vector from the omnidirectional camera 36 to the measurement point X, that is, a Ca-X directional vector (TS coordinate system) is calculated. Based on this Ca-X directional vector (TS coordinate system), the length d1 of the pointing rod 8, and the length d2 from the base end portion of the pointing rod 8 to the omnidirectional camera 36, a vector from the omnidirectional camera 36 to the measurement point X, that is, a Ca-X vector (TS coordinate system) is calculated. Then, by synthesizing the TS-Ca vector (TS coordinate system) and the Ca-X vector (TS coordinate system), a three-dimensional position of the measurement point X is recalculated. Accordingly, accuracy of three-dimensional position measurement can be improved.

Second Embodiment

Hereinafter, the same elements as in the first embodiment are designated by the same reference signs, and description thereof is omitted. In the first embodiment, the pointing rod 8 is used, however, in the second embodiment, instead of the pointing rod 8, the measuring module 4 is equipped with a small-sized distance meter. This distance meter is housed in the housing 5, and includes a module-side measurement section and a laser pointer. The module-side measurement section includes a light transmitting section that pulse-oscillates laser light and a light receiving section that receives the laser light, and based on a temporal difference until receiving the laser light and a light speed, non-prism distance measuring to measure a distance to a measurement point can be performed. The laser pointer generates, for example, laser light in a visible color linearly. For example, an optical axis of the module-side measurement section is matched with the straight line L1, and an optical axis of the laser pointer is also substantially matched with the straight line L1. However, the optical axis of the module-side measurement section and the optical axis of the laser pointer are only required to be in a known direction with respect to the straight line L1. Accordingly, the length d1 in FIG. 1 is known based on a measured distance value obtained by the module-side measurement section, so that the same effect as in the first embodiment is obtained. Further, an operator is required to only point to a measurement point with the laser pointer, so that work efficiency is further improved.

Third Embodiment

Figure 6:
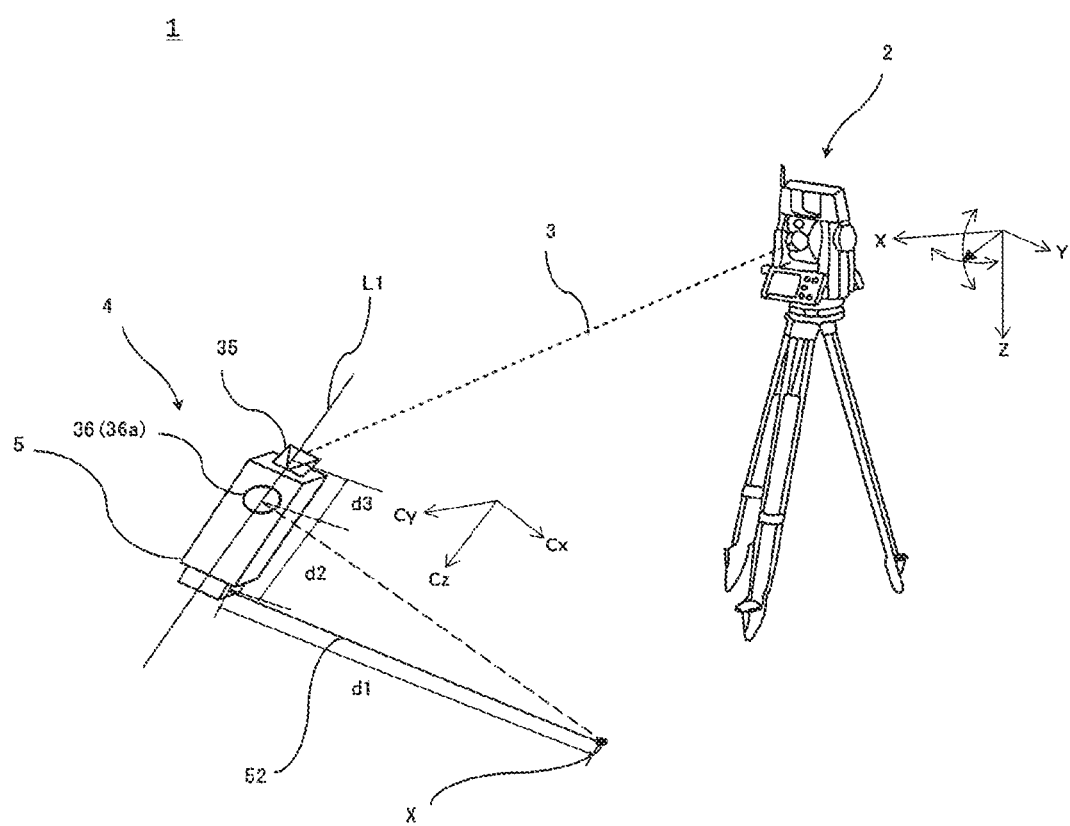
FIG. 6 is an external perspective view of a measuring system according to a third embodiment.

In a third embodiment, a pointer 51 is provided instead of the pointing rod 8. The pointer 51 is a visible light laser pointer. An optical axis 52 of the pointer 51 is only required to be in a known direction with respect to the straight line L1. FIG. 6 is an external perspective view of a measuring system according to the third embodiment. The pointer 51 is fixed to a lower surface of the housing 5. In FIG. 6, the optical axis 52 of the pointer 51 is orthogonal to the straight line L1, and set in a direction rotated 90° clockwise from the direction of the second camera 36b in a top view of the measuring module 4 when the direction of the second camera 36b is 0°. A length d2 from a laser light emitting section of the pointer 51 to the omnidirectional camera 36 (camera center) is made known in advance.

In the measuring system 1 according to the third embodiment, a distance d1 from the pointer 51 to the measurement point X is measured by using parallax from a position of light of the pointer 51 imaged by the omnidirectional camera 36 to measure a three-dimensional position of the measurement point X.

Figure 7:
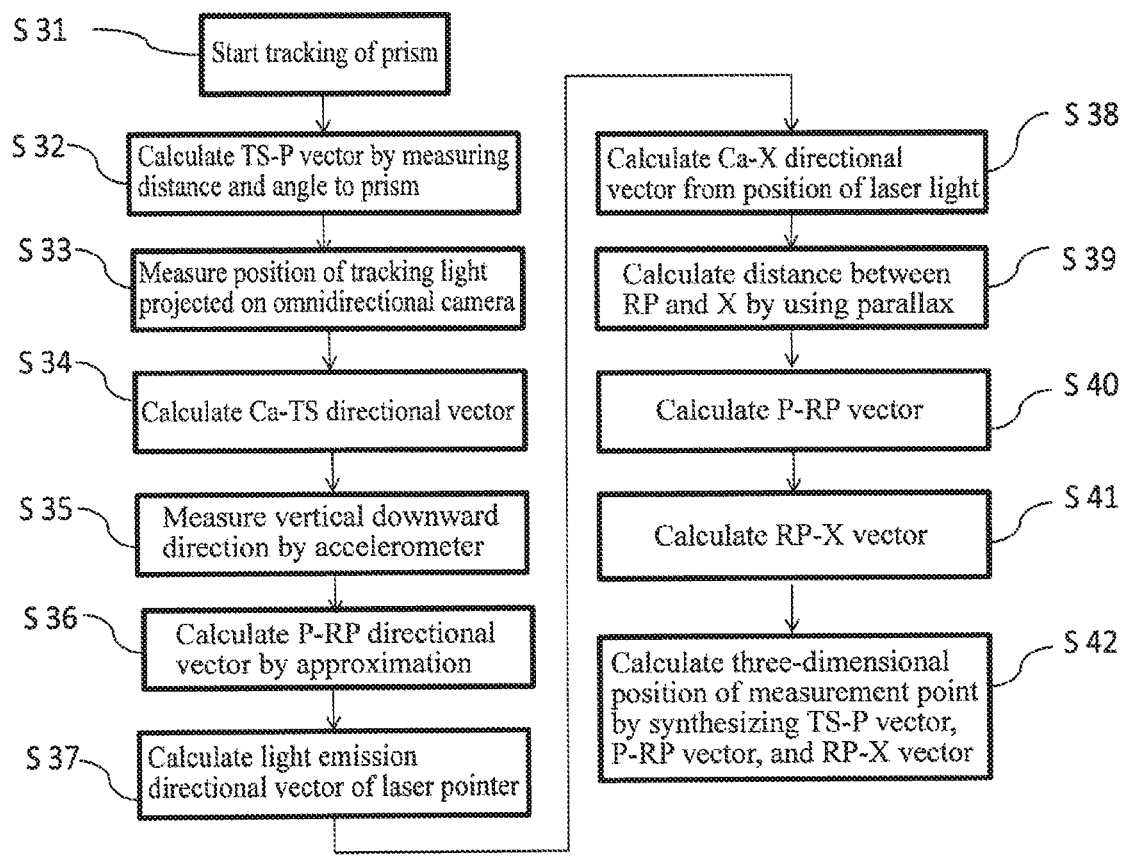
FIG. 7 is a three-dimensional position measurement flowchart according to the third embodiment.
Figure 8:
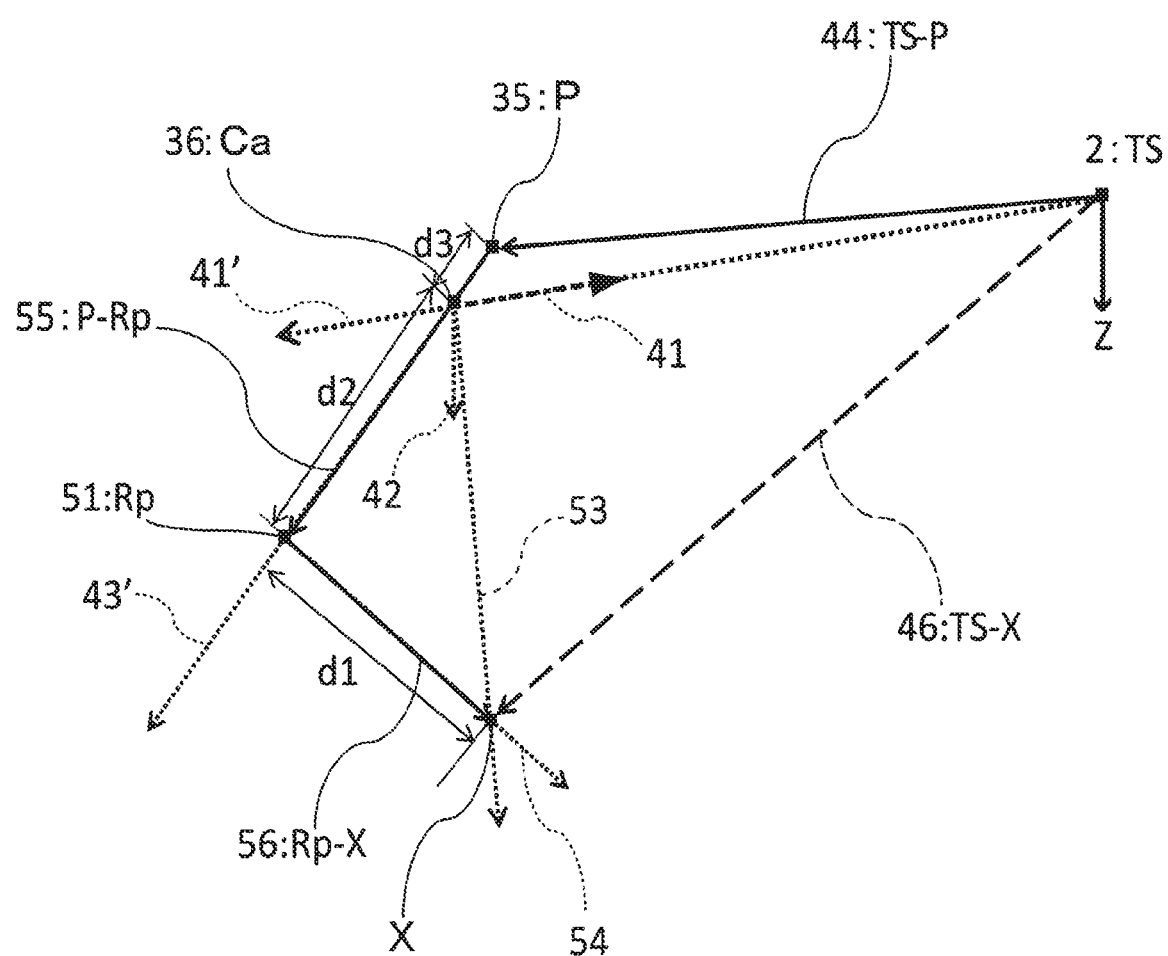
FIG. 8 is an image figure of the above-described flow.

FIG. 7 is a three-dimensional position measurement flowchart according to the third embodiment, and FIG. 8 is an image figure of the flow described above.

Steps S31 to S35 are substantially the same as Steps S11 to S15 of the first embodiment. In the third embodiment, in Step S36, a directional vector from the prism 35 to the pointer 51, that is, a P-RP directional vector 43' (TS coordinate system) is obtained.

In the next Step S37, since the direction of the optical axis 52 of the pointer is known, the arithmetic control section 32 of the measuring module 4 calculates a light emission directional vector 54 (TS coordinate system) of the pointer 51 from the P-RP directional vector 43' (TS coordinate system) obtained in Step S36.

Next, in Step S38, the arithmetic control section 32 measures a position of an image of the pointer 51 projected on an image imaged by the omnidirectional camera 36, and calculates a directional vector from the omnidirectional camera 36 to an irradiation point (measurement point X) of the laser light, that is, a Ca-X directional vector 53 (camera coordinate system).

Next, in Step S39, the arithmetic control section 32 applies the vertical downward directional vector 42 to the Z direction of the TS coordinate system, and converts the Ca-X directional vector 53 (camera coordinate system) in Step S37 into a vector in the TS coordinate system. Then, the arithmetic control section 32 calculates a distance d1 from the pointer 51 to the measurement point X from the Ca-X directional vector (TS coordinate system), the light emission directional vector 54 (TS coordinate system) in Step S37, and the known length d2.

Next, in Step S40, the arithmetic control section 32 calculates a vector from the prism 35 to the pointer 51, that is, a P-RP vector 55 (TS coordinate system) from the known lengths d2 and d3 and the P-RP directional vector 43' obtained in Step S36.

Next, in Step S41, the arithmetic control section 32 calculates a vector from the pointer 51 to the measurement point X, that is, an RP-X vector 56 (TS coordinate system) from the distance d1 to the measurement point X obtained in Step S39 and the light emission directional vector 54 (TS coordinate system) in Step S37.

Last, in Step S42, by obtaining a vector from the surveying instrument 2 to the measurement point X, that is, a TS-X vector 46 (TS coordinate system) by synthesizing the TS-P vector 44 (TS coordinate system) in Step S32, the P-RP vector 55 (TS coordinate system) in Step S40, and the RP-X vector 56 (TS coordinate system) in Step S41, the arithmetic control section 32 measures a three-dimensional position of the measurement point X.

As described above, according to the third embodiment, since the pointer 51 is used instead of a distance meter, the same effect as in the second embodiment can be obtained by a more inexpensive configuration. It is also possible that by obtaining a difference between an image when the pointer 51 outputs light and an image when the pointer does not output light by the omnidirectional camera 36, an irradiation point of the laser pointer is obtained.

Fourth Embodiment

Figure 9:
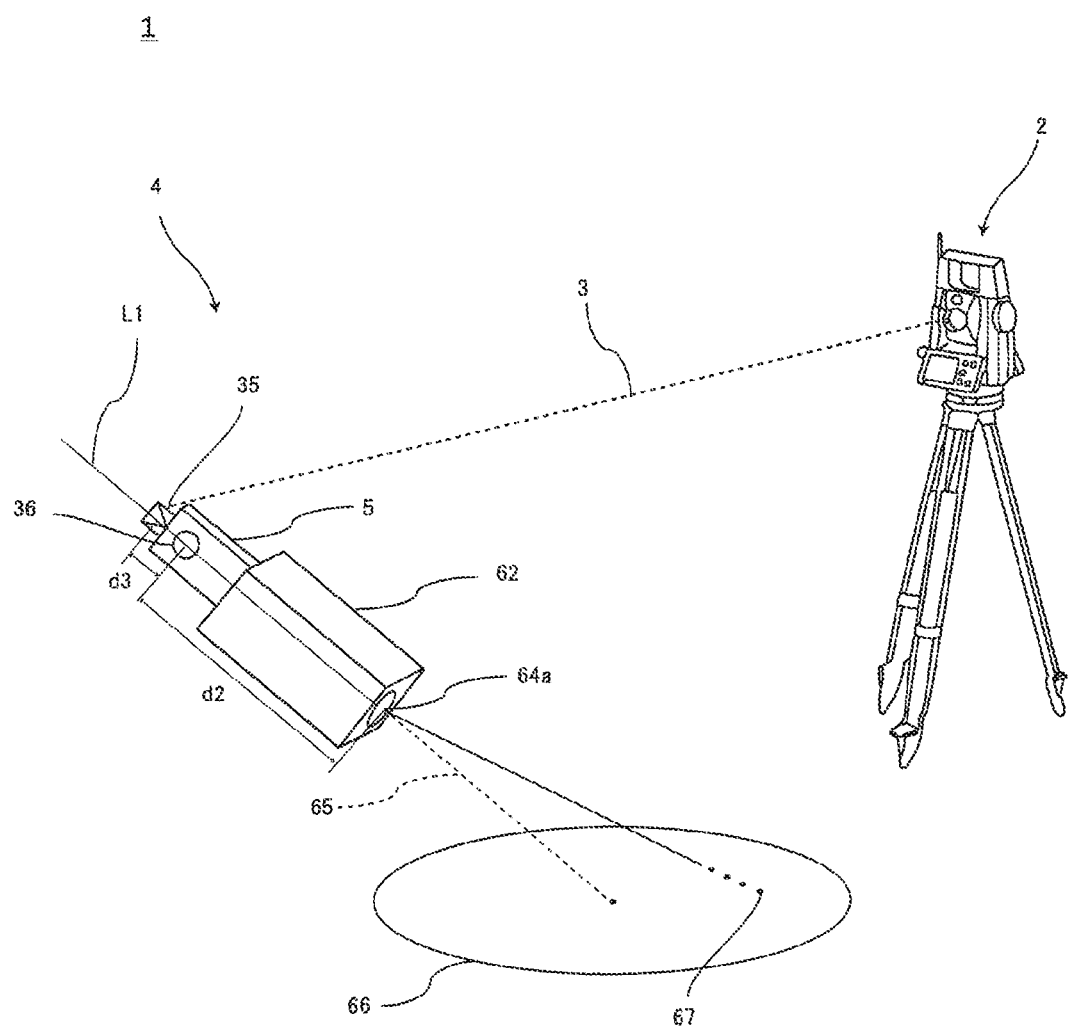
FIG. 9 is an external perspective view of a measuring system according to a fourth embodiment.
Figure 10:
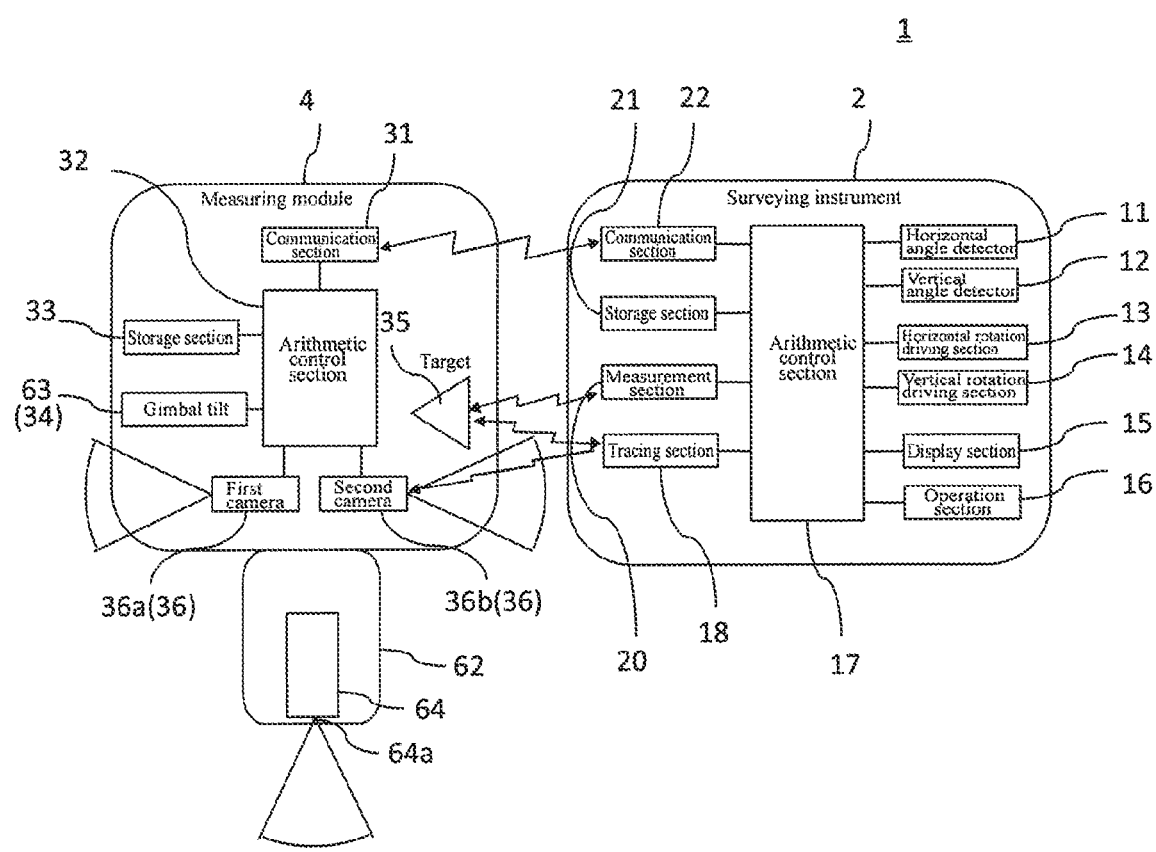
FIG. 10 is a control block diagram of the measuring system according to the fourth embodiment.

According to a fourth embodiment, on the basis of the second embodiment, instead of the small-sized distance meter used in the second embodiment, the measuring module 4 is equipped with a scanner 62. FIG. 9 is an external perspective view of a measuring system 1 according to the fourth embodiment, and FIG. 10 is a control block diagram of the measuring system 1 according to the fourth embodiment.

The measuring module 4 of the fourth embodiment includes a communication section 31, an arithmetic control section 32, a storage section 33, an accelerometer 34, a prism 35, and an omnidirectional camera 36 (a first camera 36a and a second camera 36b), and further includes a scanner 62. In the fourth embodiment, a gimbal tilt is preferably used for improvement in detection accuracy, so that a configuration including a gimbal tilt 63 as the accelerometer 34 is described. In this description, the gimbal tilt 63 is included in the accelerometer 34.

Figure 11:
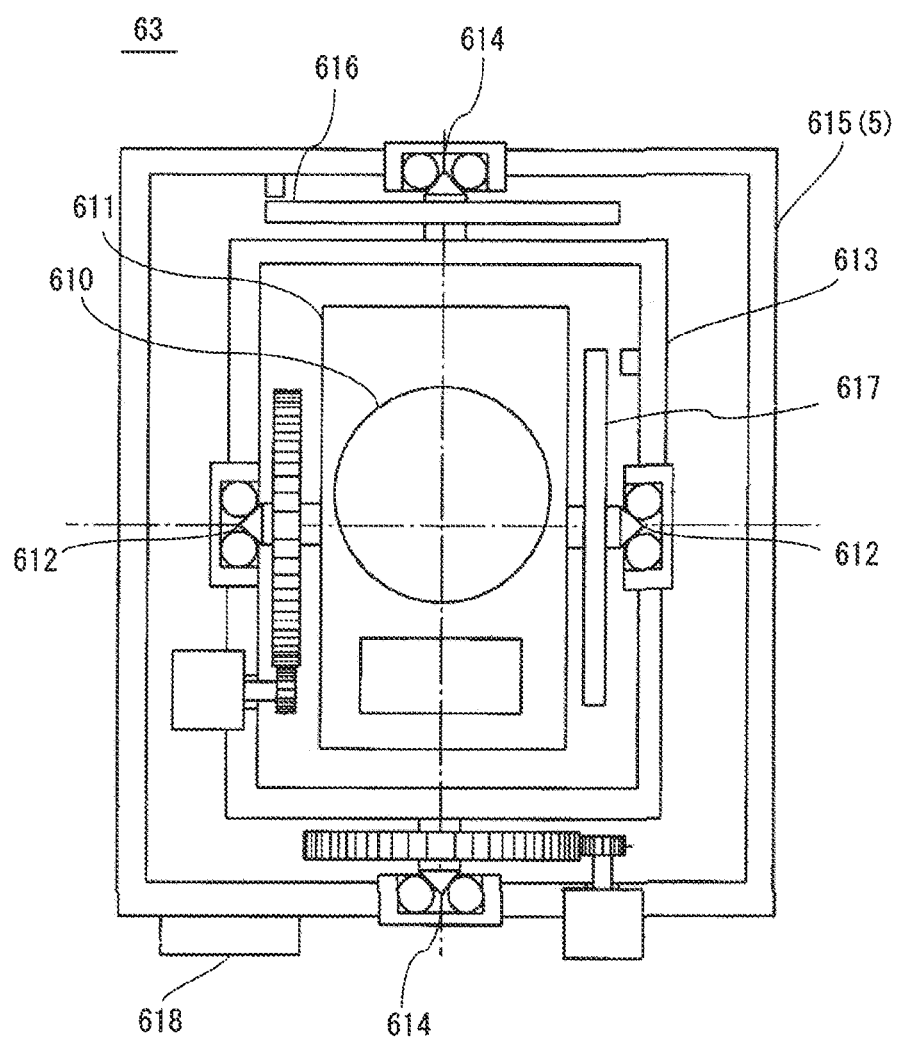
FIG. 11 is a horizontal sectional view of a gimbal tilt used in the fourth embodiment.

FIG. 11 is a horizontal sectional view of the gimbal tilt 63 used in the fourth embodiment. The gimbal tilt 63 includes an inclination detector 610, a base 611 on which the inclination detector 610 is placed, an inner frame 613 that supports the base 611 vertically and rotatably by a pair of second horizontal shafts 612, an outer frame 615 (the casing 5 serves as this frame) that supports the inner frame 613 vertically and rotatably by a pair of first horizontal shafts 614, a first encoder 616 provided on the first horizontal shaft 614 above, a second encoder 617 provided on the second horizontal shaft 612 above, and an inclination angle arithmetic section 618.

The inclination detector 610 detects horizontality with high accuracy, and is, for example, a tilt sensor that makes detection light incident on a horizontal liquid surface and detects horizontality based on a change in reflection angle of reflected light, or a bubble tube that detects an inclination based on a position change of sealed bubbles. The inclination angle arithmetic section 618 carries out an arithmetic operation of an inclination angle and an inclination direction based on detection results of the inclination detector 610, and further carries out an arithmetic operation of a rotation angle of the first encoder 616 and a rotation angle of the second encoder 617 equivalent to the inclination angle and the inclination direction. By synthesizing the operated rotation angle of the first encoder 616 and rotation angle of the second encoder 617, an arithmetic operation is carried out for an inclination angle and an inclination direction (relative inclination angle) of the housing 5 with respect to horizontality.

Thus, in the state where the inclination detector 610 is supported so as to keep horizontality by a gimbal mechanism, the gimbal tilt 63 obtains an accurate inclination angle and inclination direction of the housing 5 by using rotation angles of the first encoder 616 and the second encoder 617, so that the vertical downward directional vector 42 (refer to FIG. 15) can be accurately obtained.

Next, the scanner 62 is attached to, for example, a lower surface of the housing 5 (refer to FIG. 9). In the scanner 62, a distance image sensor is housed. The distance image sensor is preferably a Fresnel prism scanner 64. Other than this, a general distance image sensor such as a TOF type may be used.

Figure 12:
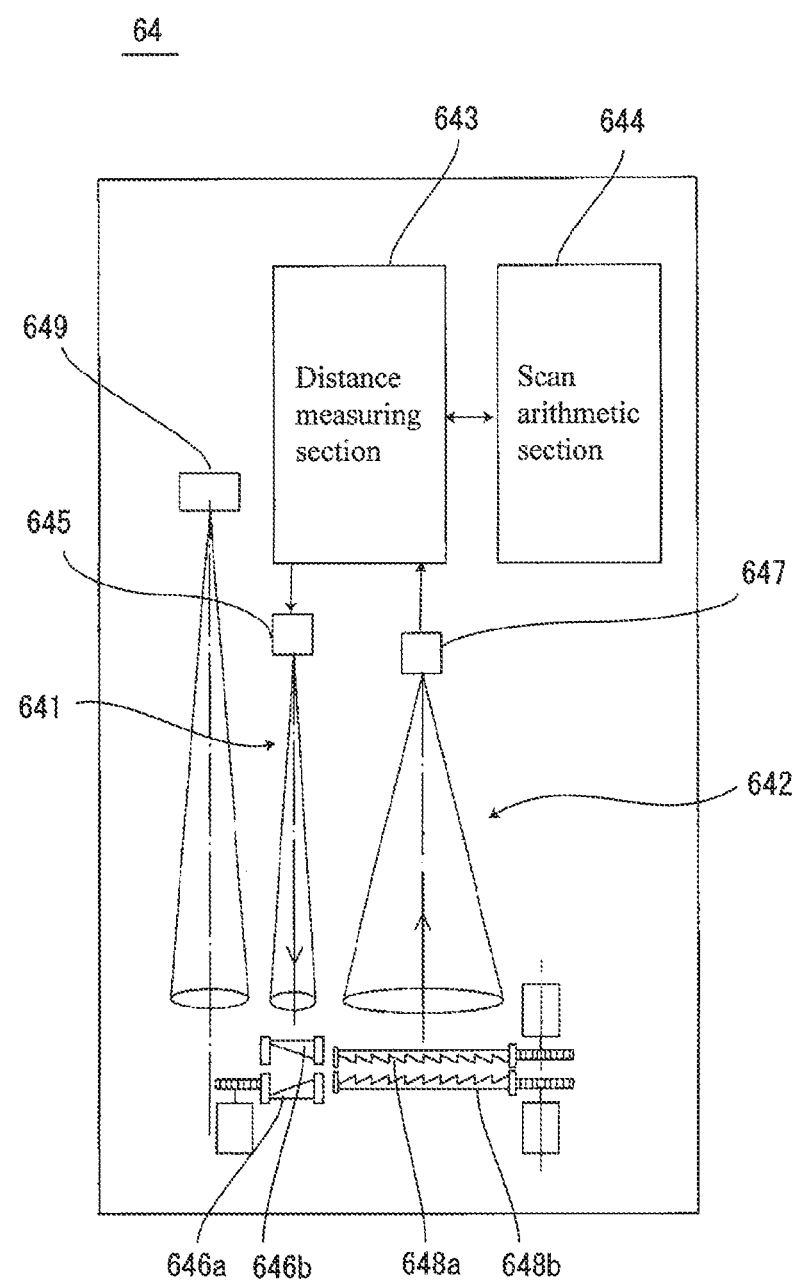
FIG. 12 is a configuration schematic view of a Fresnel prism scanner used in the fourth embodiment.

FIG. 12 is a configuration schematic view of the Fresnel prism scanner 64 used in the fourth embodiment. The Fresnel prism scanner 64 includes a light transmitting section 641, a light receiving section 642, a distance measuring section 643, and a scan calculation section 644. The light transmitting section 641 includes a light emitting element 645 and a pair of circular prisms 646a and 646b. The circular prisms 646a and 646b are opposed to each other across a light transmitting optical axis, and respectively configured independently rotatably. The light receiving section 642 includes a light receiving element 647 and a pair of Fresnel prisms 648a and 648b. The Fresnel prisms 648a and 648b are opposed to each other across the light receiving optical axis, and are respectively configured independently and rotatably. The reference sign 649 denotes an imaging device.

The distance measuring section 643 controls the light emitting element 645 to output scanning distance measuring light. The light receiving element 647 receives reflected scanning light. The scan calculation section 644 acquires point group data (a distance and an angle to a scanning point) based on a light receiving signal from the light receiving element 647. Here, by controlling rotation directions, rotation amounts, and rotation speeds of the circular prisms 646a and 646b by the scan calculation section 644, an optical axis of the scanning distance measuring light transmitted from the light emitting element 645 is deflected in an arbitrary direction. Similarly, by controlling rotation directions, rotation amounts, and rotation speeds of the Fresnel prisms 648a and 648b by the scan calculation section 644, an optical axis of reflected scanning light is deflected in an arbitrary direction. Therefore, when the circular prisms 646a and 646b are rotated integrally in a state where a positional relationship of the circular prisms 646a and 646b is fixed, scanning distance measuring light can be scanned in a circular form around a scanner reference axis 65 as a center (refer to FIG. 9) (in FIG. 9, an example of a scanning area is shown by the reference sign 66 and one of a plurality of scanning points is shown by the reference sign 67).

A length d2 from a light output point 64a (refer to FIG. 9) of the Fresnel prism scanner 64 to the omnidirectional camera 36 (camera center), and a length d3 from the omnidirectional camera 36 (camera center) to the prism 35 (prism center), are made known in advance. The scanner 62 is configured so that the light is parallel light until reaching the output point 64a, and the light is deflected from the output point 64a.

Figure 13:
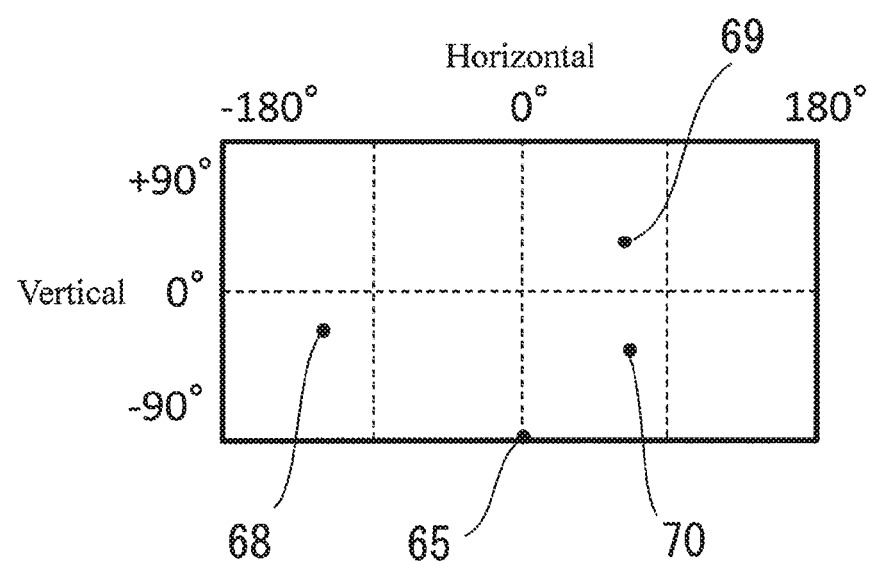
FIG. 13 is a diagram illustrating an image imaged by an omnidirectional camera in the fourth embodiment.

FIG. 13 is a diagram illustrating an image imaged by the omnidirectional camera 36 in the fourth embodiment. As shown in FIG. 9, the omnidirectional camera 36 and the scanner 62 are integrated together, so that the scanner reference axis 65 is at a relatively fixed position in a local coordinate system of the camera. In FIG. 13, a position of the Ts-Ca directional vector 41' (refer to FIG. 4) is shown by the reference sign 68, a position of tracking light is shown by the reference sign 69, and a position of the vertical downward directional vector 42 (refer to FIG. 4) is shown by the reference sign 70.

Figure 14:
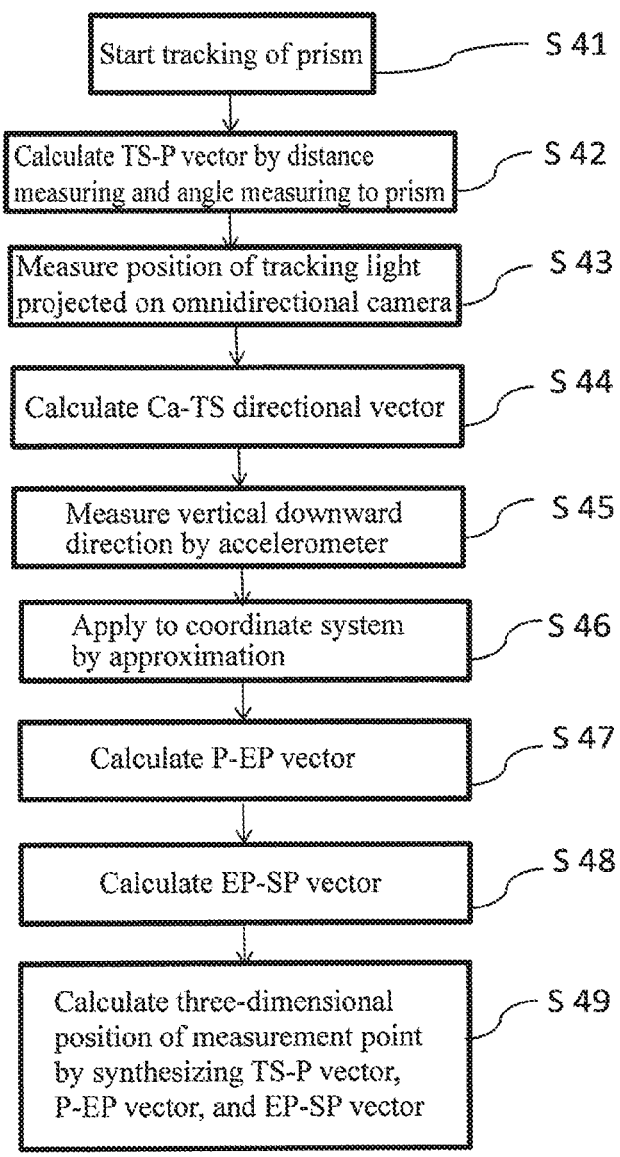
FIG. 14 is a three-dimensional position measurement flowchart according to the fourth embodiment.
Figure 15:
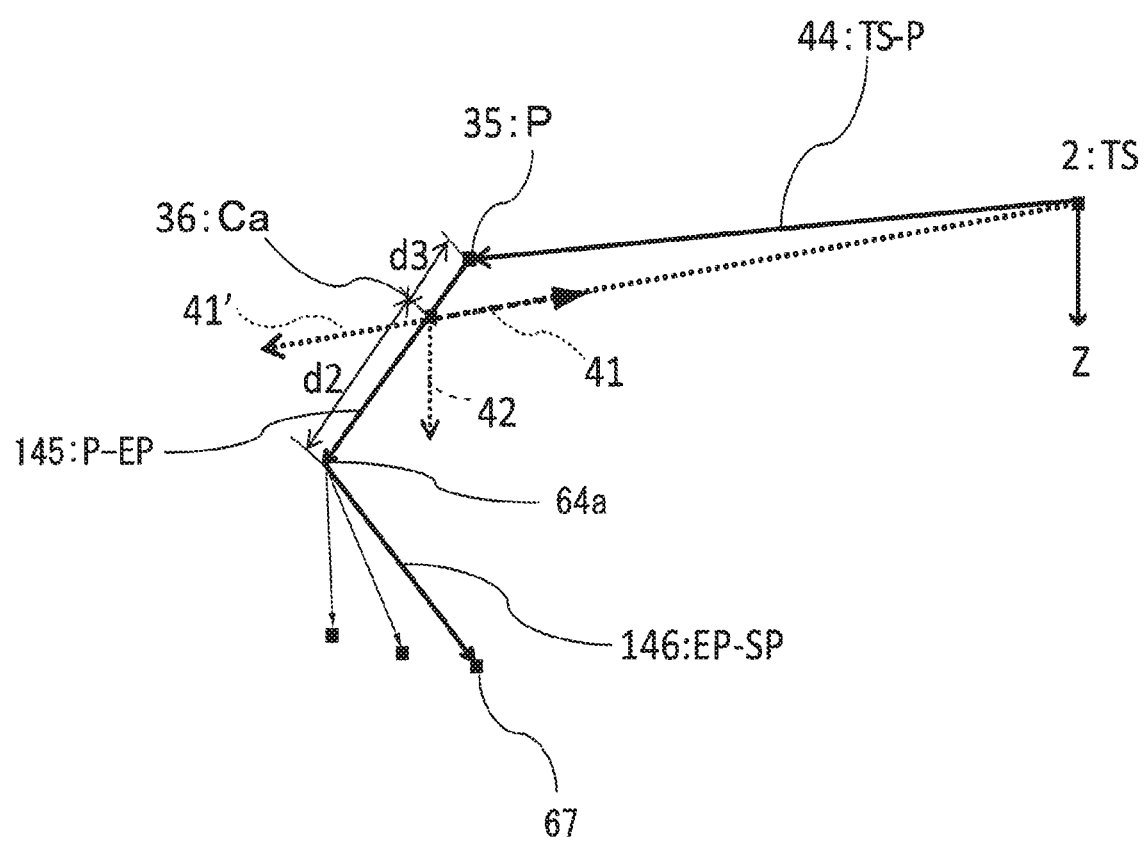
FIG. 15 is an image figure of the above-described flow.

FIG. 14 is a three-dimensional position measurement flowchart according to the fourth embodiment, and FIG. 15 is an image figure of the flow described above.

As in the first embodiment, first, automatic tracking of the surveying instrument 2 is started in Step S41, a TS-P vector 44 (TS coordinate system) is calculated in Step S42, a Ca-TS directional vector 41 (camera coordinate system) is calculated in Steps S43 and S44, and a vertical downward directional vector 42 (camera coordinate system) is measured in Step S45.

Next, in Step S46, by using the same approximation as in the first embodiment, the Ts-Ca directional vector 41' is applied to the TS coordinate system, and simultaneously, the vertical downward directional vector 42 is applied to the Z direction of the TS coordinate system.

Next, in Step S47, from the fact that a direction of the scanner reference axis 65 is relatively fixed in the camera coordinate system, and the length d2 and the length d3, a vector from the prism 35 to the light output point 64a of the Fresnel prism. 64, that is, a P-EP vector 145 (TS coordinate system) is calculated.

Next, in Step S48, from a measured distance and deflection direction measured by the Fresnel prism 64, a vector from the light output point 64a to the scanning point 67, that is, an EP-SP vector 146 (TS coordinate system) is obtained with respect to each scanning point 67.

Last, in Step S49, the arithmetic control section 32 measures a three-dimensional position of each scanning point 67 by synthesizing the TS-P vector 44 (TS coordinate system) in Step S42, the P-EP vector 145 (TS coordinate system) in Step S47, and the EP-SP vector 146 (TS coordinate system) in Step S48.

As described above, according to the fourth embodiment, three-dimensional point group data of an area scanned with the scanner 62 can be automatically acquired as long as the area is within the reach of tracking light from the surveying instrument 2.

In FIG. 9, the scanner reference axis 65 is matched with the straight line L1 that passes through the center of the prism 35 and the center of the omnidirectional camera 36. However, the scanner reference axis 65 is only required to be in a known direction with respect to the straight line L1. In addition, it is also possible that the scanner 62 of the fourth embodiment is applied to the measuring module 4 of the third embodiment. In this case, the scanner reference axis 65 is relatively fixed to the center of the camera image of the omnidirectional camera 36.

Next, preferred modifications of the above-described embodiments are described.

Modification 1

In the first and second embodiments, in Step S17, the P-X vector from the prism 35 to the measurement point X is obtained, however, it is also possible that a vector from the omnidirectional camera 36 to the measurement point X is obtained on the assumption that the prism 35 is at a position returned by the length d3 in a direction opposite to the P-X directional vector 43 from the omnidirectional camera 36. The same applies to Step S40 in the third embodiment. The same applies to the fourth embodiment.

Modification 2

In the first to third embodiments, a guide light having a known positional relationship with the surveying instrument 2 main body is further provided (fixed to, for example, a known position on an upper surface of the bracket portion 2b), and light to be imaged by the omnidirectional camera 36 may be changed from tracking light to guide light. That is, light output from the light output section of the surveying instrument 2 is not limited to tracking light, and may be other light. The same applies to the fourth embodiment.

In all embodiments described above, the respective elements of the measuring module 4 of the measuring system 1 and dispositions thereof are not limited to those illustrated. As the prism 35 (target), any target may be adopted as long as the target retro-reflects light made incident from 360-degree directions. As the omnidirectional camera 36, any camera can be adopted as long as the camera can image all directions at a time. The shape of the housing 5 is not limited to the illustrated shape and may be changed. The prism 35 and the omnidirectional camera 36 arranged on the same straight line are compact and preferable, however, the prism. 35 and the omnidirectional camera 36 may not be on the same straight line but may be offset from each other as long as the positional relationship of dispositions is made known in advance. Concerning the measurement point X, it is only required to adopt a configuration that makes known the positional relationship (direction and distance) of the measurement point with respect to the measuring module 4 as shown in the third embodiment.

Embodiments and modifications of the measuring system 1 are described above, and other than these, each embodiment and each modification can be combined based on knowledge of a person skilled in the art, and such a combined embodiment is also included in the scope of the present invention.

LIST OF COMPONENTS

1 Three-dimensional position measuring system
2 Surveying instrument
4 Measuring module
X Measurement point
8 Pointing rod
18 Tracking section (light output section)
20 Measurement section
34 Triaxial accelerometer
35 Prism (target)
36 Omnidirectional camera
41 Ca-TS directional vector (camera-surveying instrument directional vector)
42 Vertical downward directional vector
43 P-X directional vector (target-measurement point directional vector)
44 TS-P vector (surveying instrument-target vector)
45 P-X vector (target-measurement point vector)
45 TS-X vector (surveying instrument-measurement point vector)
51 Pointer
43' P-RP directional vector (target-pointer directional vector)
53 Ca-X directional vector (camera-measurement point directional vector)
54 Light emission directional vector
55 P-RP vector (target-pointer vector)
56 RP-X vector (pointer-measurement point vector)
62 Scanner
64a Light output point of scanner
65 Scanner reference axis
67 Scanning point
145 P-EP vector (prism-output point vector)
146 EP-SP vector (output point-scanning point vector)

The invention claimed is:

1. A three-dimensional position measuring system comprising:
a measuring module that includes a target, an omnidirectional camera, a triaxial accelerometer, an arithmetic control section, and a communication section, and can grasp a positional relationship among the target, the omnidirectional camera, and a measurement point; and
a surveying instrument including a light output section that outputs light toward the target, a measurement section that performs distance measuring and angle measuring to measure a distance and an angle to the target, and a communication section that transmits measurement data of the measurement section, wherein the target and the omnidirectional camera are arranged on a straight line, and the measurement point is disposed in a known direction from the straight line by a distance meter or a pointing rod with a known length, wherein the arithmetic control section executes:
(a) measuring a distance and an angle to the target by the measurement section, and calculating a surveying instrument-target vector,
(b) outputting light to the target from the light output section, and based on a position of output light projected on an image imaged by the omnidirectional camera, calculating a camera-surveying instrument directional vector,
(c) based on the camera-surveying instrument directional vector in (b) above and a vertical downward directional vector obtained from the triaxial accelerometer, calculating a target-measurement point directional vector,
(d) based on the positional relationship among the target, the omnidirectional camera, and the measurement point, and the target-measurement point directional vector in (c) above, calculating a target-measurement point vector, and
(e) by synthesizing the vectors in (a) and (d) above, measuring a three-dimensional position of the measurement point.

2. A measuring method, wherein in the three-dimensional position measuring system according to claim 1,
(a) a distance and an angle to the target are measured by the measurement section and a surveying instrument-target vector is calculated,
(b) light is output to the target from the light output section, and based on a position of output light projected on an image imaged by the omnidirectional camera, a camera-surveying instrument directional vector is calculated,
(c) based on the camera-surveying instrument directional vector in (b) above and a vertical downward directional vector obtained from the triaxial accelerometer, a target-measurement point directional vector is calculated,
(d) based on the positional relationship among the target, the omnidirectional camera, and the measurement point, and the target-measurement point directional vector in (c) above, a target-measurement point vector is calculated, and
(e) by synthesizing the vectors in (a) and (d) above, a three-dimensional position of the measurement point is measured.

3. A three-dimensional position measuring system comprising:
a measuring module that includes a target, an omnidirectional camera, a triaxial accelerometer, an arithmetic control section, and a communication section, and can grasp a positional relationship among the target, the omnidirectional camera, and a measurement point; and a surveying instrument including a light output section that outputs light toward the target, a measurement section that performs distance measuring and angle measuring to measure a distance and an angle to the target, and a communication section that transmits measurement data of the measurement section, wherein the target and the omnidirectional camera are arranged on a straight line, and the measuring system further comprises a pointer which outputs light in a known direction with respect to the straight line and the positional relationship of which with the measuring module is grasped in advance of the distance and angle measuring, wherein the arithmetic control section executes:
- (f) measuring a distance and an angle to the target by the measurement section, and calculating a surveying instrument-target vector,
- (g) outputting light to the target by the light output section, and based on a position of output light projected on an image imaged by the omnidirectional camera, calculating a camera-surveying instrument directional vector,
- (h) based on the camera-surveying instrument directional vector in (g) above and a vertical downward directional vector obtained from the triaxial accelerometer, calculating a target-pointer directional vector,
- (i) based on a positional relationship among a light emission directional vector of the pointer obtained from the target-pointer directional vector in (h) above and the known direction, a camera-measurement point directional vector obtained from a position of light of the pointer projected on the image imaged by the omnidirectional camera, and the pointer, calculating a distance to the measurement point,
- (j) based on a positional relationship among the target, the omnidirectional camera, and the pointer and the target-pointer directional vector in (h) above, calculating a target-pointer vector,
- (k) based on the light emission directional vector obtained in (i) above and the distance, calculating a pointer-measurement point vector, and
- (l) by synthesizing the vectors in (f), (j), and (k) above, measuring a three-dimensional position of the measurement point.

4. A measuring method, wherein in the three-dimensional position measuring system according to claim 3,
- (f) a distance and an angle to the target are measured by the measurement section, and a surveying instrument-target vector is calculated,
- (g) light is output to the target by the light output section, and based on a position of output light projected on an image imaged by the omnidirectional camera, a camera-surveying instrument directional vector is calculated,
- (h) based on the camera-surveying instrument directional vector in (g) above and a vertical downward directional vector obtained from the triaxial accelerometer, a target-pointer directional vector is calculated,
- (i) based on a positional relationship among a light emission directional vector of the pointer obtained from the target-pointer directional vector in (h) above and the known direction, a camera-measurement point directional vector obtained from a position of light of the pointer projected on the image imaged by the omnidirectional camera, and the pointer, a distance to the measurement point is calculated,
- (j) based on a positional relationship among the target, the omnidirectional camera, and the pointer and the target-pointer directional vector in (h) above, a target-pointer vector is calculated,
- (k) based on the light emission directional vector obtained in (i) above and the distance, a pointer-measurement point vector is calculated, and
- (l) by synthesizing the vectors in (f), (j), and (k) above, a three-dimensional position of the measurement point is measured.

5. A three-dimensional position measuring system comprising:

a measuring module that includes a target, an omnidirectional camera, a triaxial accelerometer, an arithmetic control section, and a communication section, and can grasp a positional relationship among the target, the omnidirectional camera, and a measurement point; and a surveying instrument including a light output section that outputs light toward the target, a measurement section that performs distance measuring and angle measuring to measure a distance and an angle to the target, and a communication section that transmits measurement data of the measurement section, wherein the target and the omnidirectional camera are arranged on a straight line, and the measuring system further includes a scanner which has a scanner reference axis directed in a known direction with respect to the straight line, and a positional relationship of which with the measuring module is grasped in advance of the distance and angle measuring, wherein the arithmetic control section executes:
- (m) measuring a distance and an angle to the target by the measurement section, and calculating a surveying instrument-target vector,
- (n) outputting light toward the target from the light output section, and based on a position of output light projected on an image imaged by the omnidirectional camera, calculating a camera-surveying instrument directional vector,
- (o) acquiring a vertical downward directional vector from the triaxial accelerometer,
- (p) based on the camera-surveying instrument directional vector in (n) above and the vertical downward directional vector in (o) above, a positional relationship among the target, the omnidirectional camera, and a light output point of the scanner, and the fact that a direction of the scanner reference axis is relatively fixed in a coordinate system of the omnidirectional camera, calculating a prism-output point vector,
- (q) based on the measured distance and a deflection direction of the scanner, calculating an output point-scanning point vector for each scanning point, and
- (r) by synthesizing the vectors in (m), (p), and (q) above, measuring a three-dimensional position of each scanning point of the scanner.

6. A scanning method, wherein in three-dimensional position measuring system according to claim 5,
- (m) a distance and an angle to the target are measured by the measurement section, a surveying instrument-target vector is calculated,
- (n) light is output toward the target from the light output section, and based on a position of output light projected on an image imaged by the omnidirectional camera, a camera-surveying instrument directional vector is calculated, (o) a vertical downward directional vector is acquired from the triaxial accelerometer, (p) based on the camera-surveying instrument directional vector in (n) above and the vertical downward directional vector in (o) above, a positional relationship among the target, the omnidirectional camera, and a light output point of the scanner, and the fact that a direction of the scanner reference axis is relatively fixed in a coordinate system of the omnidirectional camera, a prism-output point vector is calculated, (q) based on the measured distance and a deflection direction of the scanner, an output point-scanning point vector is calculated for each scanning point, and (r) by synthesizing the vectors in (m), (p), and (q) above, a three-dimensional position of each scanning point of the scanner is measured.

* * * * *